United States Patent
Bechtold

3,781,097
Dec. 25, 1973

[54] ASPHERIC LENS SURFACE

[75] Inventor: Edwin W. Bechtold, Manhasset, N.Y.

[73] Assignee: Itek Corporation, Lexington, Mass.

[22] Filed: May 15, 1972

[21] Appl. No.: 253,011

[52] U.S. Cl.................. 351/167, 351/176, 350/189
[51] Int. Cl............................................... G02c 7/02
[58] Field of Search........................... 351/167, 176; 350/189

[56] References Cited
UNITED STATES PATENTS
3,169,247   2/1965   Davis et al. .......................... 351/167

OTHER PUBLICATIONS
Davis et al., Article in American Journal of Optometry and Archives, Dec. 1956, pgs. 643–660.
Roger, Article in Manufacturing Optician International, Oct. 1970, pgs. 207 and 209.

*Primary Examiner*—David H. Rubin
*Attorney*—Homer O. Blair et al.

[57] ABSTRACT

An aspheric ophthalmic lens series for use in the correction of aphakia. The series includes lenses having vertex powers extending from about $\pm 7.75$ diopters to about $\pm 18$ diopters and each of the lenses included within the series are provided with a front surface having an aspheric cross-sectional curvature defined by the equation $$x = a/(by^2 + 1) + cy^2 + dy^4 - a$$

The lens series is designed to provide improved visual acuity to the aphakic patient throughout his normal range of vision while, at the same time, afford the fitter with substantial latitude in lens selection. The aspherically curved surfaces according to the present invention are also particulary well-suited for use in a series of multifocal lenses.

6 Claims, 1 Drawing Figure

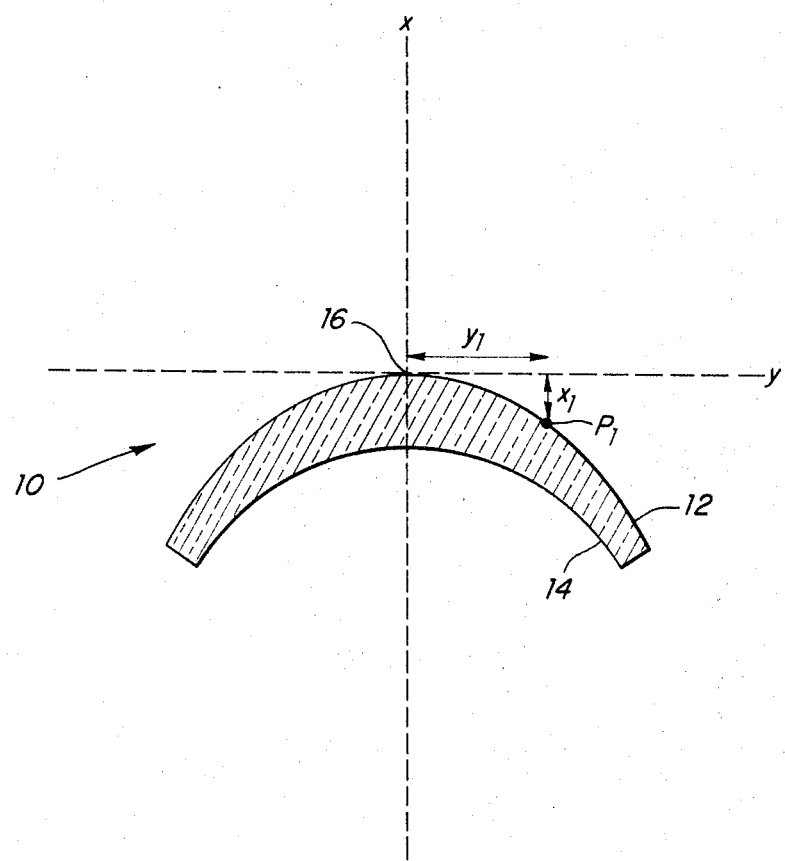

ASPHERIC LENS SURFACE

BACKGROUND OF THE INVENTION

1. Field of the Invention

The present invention relates generally to the field of ophthalmic lens design. More particularly, the present invention relates to a series of aspheric ophthalmic lenses designed to provide improved visual acuity to persons suffering from aphakia.

2. Description of the Prior Art

Aphakic patients, i.e. those who have had the crystalline lenses of their eyes removed due to cataracts or other causes, usually require spectacle lenses having powers in excess of about +8 diopters. It is generally recognized in the ophthalmic field, however, that highly positive lenses such as these cannot be adequately corrected for aberrations when they are formed with conventional spherical surfaces. In particular, it has been found that such lenses exhibit very heavy astigmatism, especially in marginal areas, which has the effect of severely restricting the wearer's field of useful vision.

Accordingly, it has been found that aspheric surfaces must be used with these high plus lenses if improved lens performance is to be obtained, and, for this reason, lenses having various aspheric shapes have been designed and marketed in the past (see, for example, U.S. Pat. No. 3,169,247). These prior designs, however, have not been fully satisfactory for several reasons. Initially, although it is possible to design aspheric lenses which are substantially free from astigmatism, curvature of field or power error cannot be effectively eliminated at the same time without introducing severe zonal errors into the lens. In the case of weaker positive lenses this aberration is usually not of serious concern because it is fairly small and can readily be accommodated for by the otherwise normal eye. Cataract patients, however, have no accommodation mechanism left and thus are no longer capable of compensating for these errors which are inevitably higher in the stronger lenses. The effect is that vision becomes more or less blurred, particularly in peripheral areas.

In order to reduce power error in a lens, various design compromises may be made. For example, by retaining a certain amount of astigmatism the power error may be reduced, however, in many cases, this has the effect of reducing visual acuity because of the high amounts of astigmatism required. In general, the prior art aspheric lens designs simply do not have the capability of adequately minimizing all aberrations to provide optimum visual acuity throughout the normal field of vision.

Yet another problem with many of the prior art aspheric lens designs is that they are not suitable for use in multifocal lenses. For example, in many designs the reading segment, when incorporated into the lens, becomes quite irregular and unattractive in appearance and this can affect the marketability of the lens.

Finally, many of the prior art aspheric designs do not provide the fitter with sufficient flexibility in lens selection to cover the many needs of all patients.

SUMMARY OF THE PREFERRED EMBODIMENT OF THE INVENTION

In accordance with a preferred embodiment of the present invention many of the above-mentioned problems have been obviated by providing a series of lenses having novel aspherically curved surfaces. In particular, the lenses making up this series are all provided with a front surface having a cross-sectional curvature defined by the equation $$x = a/(by^2 + 1) + cy^2 + dy^4 - a$$

It has been found that by the suitable selection of values for the coefficients of this equation, that improved vision may be provided for a series of lenses having vertex powers covering a range from between about +7.75 diopters to about +18 diopters and that improved visual acuity may be obtained not only along the optical axis but throughout the normal range of vision out to about 30° relative to the optical axis.

In accordance with a more preferred embodiment of the invention, it has been found that lens performance is maximized when the coefficients of the equation are calculated to provide: (1) substantially correct axial vertex power, (2) tangential and sagittal focus errors which are substantially equal and opposite at a field angle of 20°, and (3) a substantially zero tangential focus error at a field angle of 30°.

In addition to improved vision, the lens series according to the present invention also provides other significant advantages. For one thing, the aspheric surface is readily usable in multifocal lenses and does not cause the reading segment to assume an irregular or otherwise unattractive appearance. In addition, the lens series will provide the fitter with substantial latitude in selecting lenses to be finished in accordance with the individual requirements of the patient.

In general, the present invention provides a novel series of aspheric lenses that will provide improved vision to the aphakic patient while, at the same time, provide the fitter with substantial flexibility in satisfying the prescription requirements of all patients.

BRIEF DESCRIPTION OF THE DRAWINGS

The single FIGURE illustrates, in schematic cross-sectional form, a lens in accordance with the present invention.

DETAILED DESCRIPTION OF THE PREFERRED EMBODIMENT

The FIGURE schematically illustrates a lens 10 designed in accordance with the present invention. This lens includes a front refractive surface 12 which is provided with one of a series of aspheric base curves as will be described hereinafter and a conventional rear or ocular refractive surface 14 which may be molded or ground to the particular prescription requirements of the individual patient. Reference number 16 identifies the vertex of the front surface 12 through which the optical axis $x$ extends. Axis $y$, as illustrated, is perpendicular to axis $x$ and also extends through the vertex 16.

As described previously, the lens surface 12 in accordance with the present invention and with reference to the FIGURE, is provided with an aspheric shape defined by the equation $$x = a/(by^2 + 1) + cy^2 + dy^4 - a$$

where:
  $x$ represents the distance from the front surface vertex 16 of the lens in a direction parallel to the optical axis;
  $y$ represents the perpendicular distance from the optical axis at any point $x$; and coefficients $a$, $b$, $c$ and $d$ are constants selected to provide desired lens characteristics as will be explained in greater detail hereinafter.

This is illustrated more clearly in the FIGURE where a point P, on surface 12 is identified by coordinates $x_1$ and $y_1$.

It should be understood that the aspheric lens surface, being three dimensional in shape, will also have a z-component extending perpendicular to the paper through vertex 16, however, this component will be identical to the y-component because of the symmetry of the lens and may thus be ignored in the equation.

As described previously, it has been found that a series of lenses each of which have a front aspheric surface defined by this equation can, by the suitable selection of coefficient values, be designed to provide substantially improved performance over conventional aspheric lenses; and, in particular, can provide good, clear vision to the wearer throughout his normal field of vision. The precise values for these coefficients, as recognized by those skilled in the art, are a function of various parameters including the index of refraction of the lens material, the thickness of the lens, the curvature of the back surface of the lens, and the like; and in additon, depend upon the particular lens characteristics desired. Since it is simply not possible to eliminate all aberrations with a single lens element, design compromises must be made and the goal in the ophthalmic industry is to design lenses that will minimize the aberrations that affect vision in such a manner as to provide optimum visual acuity to the wearer. To the ophthalmic lens designer, the aberrations of primary significance are astigmatism, Petzval or power error, and the chromatic aberrations. Evidence has shown that spherical aberration and coma are not significant in ophthalmics and may generally be ignored. Although distortion may be significant in cataract lenses, it cannot be greatly reduced without introducing severe focus errors, however, evidence has shown that lenses designed in accordance with the present invention exhibit somewhat less distortion than most other lens designs.

In manipulating these aberrations to provide optimum lens performance it is necessary that the lens provide good vision for all directions of gaze out to about 30° relative to the optical axis. This means that in any particular zone of the lens, the aberrations should be minimized. Also, the lateral chromatic aberration in a lens is particularly annoying to the eyeglass wearer and affects resolution in the tangential direction. Therefore, it is also necessary to keep the asitgmatic errors in the tangential direction as small as possible.

By taking all of these requirements into consideration, it has been found that effective results are obtained when the values of the coefficients $a$, $b$, $c$ and $d$ are selected to provide: (1) substantially correct axial vertex power; (2) tangential and sagittal focus errors which are substantially equal and opposite at a field angle of 20°; and (3) substantially zero tangential focus error at a 30° field angle. TABLE 1 lists the values for the coefficients $a$, $b$, $c$ and $d$ for a series of aspheric lens surfaces that will substantially provide these characteristics.

TABLE 1

| Base Curve | a | b | c | d |
|---|---|---|---|---|
| 10.43 | −2.193 | 0.0005 | −.0115789 | −5.640×10⁻⁷ |
| 11.43 | −0.6585 | 0.0005 | −.0118166 | −1.332×10⁻⁶ |
| 12.43 | +0.6188 | 0.0005 | −.0121830 | −2.105×10⁻⁶ |
| 13.43 | +1.920 | 0.0005 | −.0125374 | −2.888×10⁻⁶ |
| 14.43 | +0.8208 | 0.001 | −.0136817 | −3.640×10⁻⁶ |
| 15.43 | +1.613 | 0.001 | −.0138945 | −4.820×10⁻⁶ |
| 16.43 | +2.197 | 0.001 | −.0143155 | −6.035×10⁻⁶ |
| 17.43 | +2.164 | 0.001 | −.0153535 | −6.673×10⁻⁶ |

TABLE 1 specifically illustrates a series of lens surfaces having base curves extending from +10.43 diopters to +17.43 diopters in one diopter steps. By direct interpolation, coefficient values for base curves falling in between these values may readily be obtained.

The improved performance afforded by a series of lenses provided with the aspheric surfaces described in TABLE 1 above may best be understood by an examination of TABLE 2 which illustrates the tangential and sagittal errors at various field angles for a series of lenses provided with the aspheric surfaces set forth in TABLE 1. In TABLE 2, the numbers given in the parentheses are the aspheric base curves employed with each of the lenses listed. The errors are expressed in diopters. The lenses have an index of refraction of 1.4975. The center thickness is in millimeters.

Note the superscripts on d column values use ×10⁻⁷ for the first row.

TABLE 2

| Vertex power | Center thickness | 10° | | 15° | | 20° | | 25° | | 30° | |
|---|---|---|---|---|---|---|---|---|---|---|---|
| | | T | S | T | S | T | S | T | S | T | S |
| +7.75 (10.43) | 5.1 | .04 | −.02 | +.08 | −.04 | +.10 | −.08 | +.09 | −.15 | 0 | −.24 |
| +8.50 (11.43) | 5.4 | +.04 | −.02 | +.08 | −.05 | +.10 | −.10 | +.08 | −.17 | +0 | −.27 |
| +9.50 (12.43) | 5.8 | +0.5 | −.02 | +.09 | −.05 | +.12 | −.10 | +.11 | −.18 | +.03 | −.29 |
| +10.75 (13.43) | 6.3 | +.06 | −.02 | +.11 | −.06 | +.15 | −.11 | +.13 | −.20 | +.01 | −.32 |
| +12.00 (14.43) | 6.8 | +.06 | −.03 | +.11 | −.07 | +.16 | −.13 | +.15 | −.23 | +.01 | −.36 |
| +13.25 (15.43) | 7.3 | +.04 | −.04 | +.09 | −.09 | +.14 | −.16 | +.14 | −.27 | 0 | −.41 |
| +14.50 (16.43) | 7.8 | +.06 | −.04 | +.13 | −.09 | +.20 | −.16 | +.20 | −.27 | 0 | −.43 |
| +16.00 (17.43) | 8.4 | +.07 | −.04 | +.15 | −.09 | +.20 | −.17 | +.12 | −.29 | −.12 | −.49 |

It should be noted from TABLE 2 that sagittal errors never exceed 0.5 diopters and that tangential errors never exceed 0.2 diopters.

The specific manner by which the coefficients $a$, $b$, $c$ and $d$ of the equation are determined are quite complex but need not be explained in detail here as they are well known to persons skilled in the art. The techniques employed include those of tracing a large number of rays through the lens, and making precise calculations of the refraction of the rays as they travel through the lens utilizing Coddington's equations or the like. These calculations are generally carried out with the help of a computer using well known techniques.

In addition to providing improved lens performance, several other significant advantages are also obtained by employing a series of lenses having the aspherically curved surface described above. For one thing, the flexibility afforded to the fitter in correcting these lenses to meet the particular prescription requirements of the individual patients is enhanced. For example, it has been found that the curvature of the inside surface of the lens does not significantly affect the lens performance and, accordingly, inside curves of from −1 to −6 diopter may be chosen based on considerations other than aberration correction. For this reason, lap cutting equipment presently on hand may generally be used to grind the inside surfaces.

It has also been found that variations in lens performance with respect to changes in fitting distance are minimal and that these lenses may be used in any conventional fitting distance, for example, from 10 to 15 mm from the vertex of the cornea. Similarly, lens thickness variations will not significantly affect the lens aberrations.

Also it is possible to use each of the individual aspheric surfaces within the series for a substantial range of lens powers. This is shown in TABLE 3 which is a surfacing chart illustrating the powers available from each aspheric base curve. In TABLE 3, optimum forms are identified by the letter X. A slightly inferior performance can be achieved with the combinations illustrated by the letter O. These may be used when the two eyes require drastically different aspheric front curves. The remaining combinations shown by the letter N are possible but not recommended due to high residual aberrations.

TABLE 3

| V.P. | 10.43 | 11.43 | 12.43 | 13.43 | 14.43 | 15.43 | 16.43 | 17.43 |
|---|---|---|---|---|---|---|---|---|
| 7.00 | X | N | | | | | | |
| 7.25 | X | N | | | | | | |
| 7.50 | X | O | | | | | | |
| 7.75 | X | O | | | | | | |
| 8.00 | X | X | N | | | | | |
| 8.25 | O | X | N | | | | | |
| 8.50 | O | X | O | | | | | |
| 8.75 | N | X | O | | | | | |
| 9.00 | N | X | X | | | | | |
| 9.25 | | O | X | N | | | | |
| 9.50 | | O | X | N | | | | |
| 9.75 | | N | X | O | | | | |
| 10.00 | | N | X | O | | | | |
| 10.25 | | | O | X | | | | |
| 10.50 | | | O | X | N | | | |
| 10.75 | | | N | X | N | | | |
| 11.00 | | | N | X | O | | | |
| 11.25 | | | | X | O | | | |
| 11.50 | | | | O | X | | | |
| 11.75 | | | | O | X | N | | |
| 12.00 | | | | N | X | N | | |
| 12.25 | | | | N | X | O | | |
| 12.50 | | | | | X | O | | |
| 12.75 | | | | | O | X | | |
| 13.00 | | | | | O | X | N | |
| 13.25 | | | | | N | X | N | |
| 13.50 | | | | | N | X | O | |
| 13.75 | | | | | | X | O | |
| 14.00 | | | | | | O | X | |
| 14.25 | | | | | | O | X | |
| 14.50 | | | | | | N | X | N |
| 14.75 | | | | | | N | X | N |
| 15.00 | | | | | | | X | O |
| 15.25 | | | | | | | X | O |
| 15.50 | | | | | | | O | X |
| 15.75 | | | | | | | O | X |
| 16.00 | | | | | | | N | X |
| 16.25 | | | | | | | N | X |
| 16.50 to 19.00 | | | | | | | | X X X |

The lenses of this series are also, of course, capable of receiving the conventional cylinder and prism corrections generally needed.

The series of lenses described above also provides the advantage of being readily employable with multi-focal lenses. In some aspheric lenses a bifocal segment becomes quite irregular in appearance due to the curvature of the lens and this affects the cosmetic appearance of the lens and hence its marketability. With the present design, it has been found that the reading segments do not become very irregular. For example, a round segment shape, when incorporated into the lens, will appear only very slightly eliptical (e.g. 20mm × 19mm).

Finally, the lenses according to this invention may be manufactured from either glass or plastic. In practice, however, they are primarily designed to be made from plastic due to the greater ease in casting rather than grinding aspheric shapes.

In conclusion, it should be understood that the above described lens series is meant to be a preferred embodiment only and by changing the basic design requirements, the coefficients of the equation would become altered to some degree. For example, it might be decided that tangential and sagittal focus errors be substantially equal and opposite at a field angle of other than 20° or that they differ only slightly from each other at that field angle. Furthermore, it might be decided to intentionally leave some tangential focus error into the lens at 30°. It is intended that these other designs possibilities fall within the present invention and that persons skilled in the art would have no trouble making these changes if desired. Accordingly, it is intended that the present invention be limited only as required by the scope of the following claims.

I claim:

1. An aspheric ophthalmic lens for providing desired lens characteristics at substantially all viewing field angles from the optical axis out to about 30° relative to the optical axis, said lens having a front surface and a rear prescriptive surface wherein the front surface of said lens has an aspheric cross-sectional curvature defined by the equation $$x = a/(by^2 + 1) + cy^2 + dy^4 - a$$

wherein:

$x$ = the distance from the front surface vertex of the lens in a direction parallel to the optical axis of the lens;

$y$ = the perpendicular distance from the optical axis at any point $x$; and $a$, $b$, $c$ and $d$ are coefficients selected to provide the following lens characteristics:
  a. a substantially correct axial vertex power;
  b. a substantially zero tangential focus error at a relatively large field angle relative to the optical axis;
  c. tangential and sagittal focus errors which are approximately equal and opposite at an intermediate field angle relative to the optical axis; and
  d. substantially minimized zonal aberrations.

2. An ophthalmic lens as recited in claim 1 wherein the coefficients $a$, $b$, $c$ and $d$ are selected to provide said lens with:
  a. a substantially zero tangential focus error at a field angle of approximately 30° relative to the optical axis; and
  b. tangential and sagittal focus errors which are approximately equal and opposite at a field angle of approximately 20° relative to the optical axis.

3. A series of aspheric ophthalmic lenses for providing desired lens characteristics at substantially all viewing field angles from the optical axis out to about 30° relative to the optical axis wherein each of the lenses included within said series has a front surface and a rear prescriptive surface, and wherein the front surface of each of the lenses within said series has an aspheric cross-sectional curvature defined by the equation $$x = a/(by^2 + 1) + cy^2 + dy^4 - a$$

wherein
  $x$ = the distance from the front surface vertex of the lens in a direction parallel to the optical axis of the lens;
  $y$ = the perpendicular distance from the optical axis at any point $x$; and
  $a$, $b$, $c$ and $d$ are coefficients selected to provide the following lens characteristics:
    a. a substantially correct axial vertex power;
    b. a substantially zero tangential focus error at a relative large field angle relative to the optical axis;
    c. tangential and sagittal focus errors which are approximately equal and opposite at an intermediate field angle relative to the optical axis; and
    d. substantially minimized zonal aberrations.

4. An ophthalmic lens series as recited in claim 3 wherein the coefficients $a$, $b$, $c$ and $d$ are selected to provide:
  a. a substantially zero tangential focus error at a field angle of approximately 30° relative to the optical axis; and
  b. tangential and sagittal focus errors which are approximately equal and opposite at a field angle of approximately 20° relative to the optical axis.

5. An ophthalmic lens series as recited in claim 3 wherein said series of lenses comprises lenses having vertex powers from between about +7.75 diopters to about +18 diopters.

6. A series of aspheric ophthalmic lens surfaces for use with a plurality of lenses having vertex powers extending from about +7.75 diopters to about +18 diopters, each of said plurality of lenses being provided with one of said series of aspheric surfaces on the front surface thereof, wherein said series of aspheric surfaces extends from a base curve of +10.43 diopters to +17.43 diopters and wherein each of the aspheric surfaces in said series has a cross-sectional curvature defined by the equation $$x = a/(by^2 + 1) + cy^2 + dy^4 - a$$

wherein
  $x$ = the distance from the front surface vertex of the lens in a direction parallel to the optical axis of the lens;
  $y$ = the perpendicular distance from the optical axis at any point $x$; and
  the coefficients $a$, $b$, $c$ and $d$ have the values listed in the following table for particular base curves in diopters within the series, the coefficient values for other base curves being obtainable from the table by direct interpolation.

| Base Curve | a | b | c | d |
|---|---|---|---|---|
| 10.43 | −2.193 | .0005 | −.0115789 | $-5.640 \times 10^{-7}$ |
| 11.43 | −0.6585 | .0005 | −.0118166 | $-1.332 \times 10^{-6}$ |
| 12.43 | +0.6188 | .0005 | −.0121830 | $-2.105 \times 10^{-6}$ |
| 13.43 | +1.920 | .0005 | −.0125374 | $-2.888 \times 10^{-6}$ |
| 14.43 | +0.8208 | .001 | −.0136817 | $-3.640 \times 10^{-6}$ |
| 15.43 | +1.613 | .001 | −.0138945 | $-4.820 \times 10^{-6}$ |
| 16.43 | +2.197 | .001 | −.0143155 | $-6.035 \times 10^{-6}$ |
| 17.43 | +2.164 | .001 | −.0153535 | $-6.673 \times 10^{-6}$ |

* * * * *